(12) United States Patent
Göhring et al.

(10) Patent No.: US 7,806,801 B2
(45) Date of Patent: Oct. 5, 2010

(54) DRIVETRAIN AND ASSOCIATED OPERATING METHOD

(75) Inventors: Markus Göhring, Nufringen (DE); Marco Fleckner, Leonberg (DE); Nils Sauvlet, Bad Essen (DE); Dieter Kraxner, Wurmberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 620 days.

(21) Appl. No.: 11/829,996

(22) Filed: Jul. 30, 2007

(65) Prior Publication Data

US 2008/0032856 A1    Feb. 7, 2008

(30) Foreign Application Priority Data

Jul. 28, 2006    (DE) .................. 10 2006 034 935

(51) Int. Cl.
*B60W 10/02* (2006.01)
*B60W 10/06* (2006.01)
*B60W 10/08* (2006.01)

(52) U.S. Cl. .......................................... 477/5; 477/168
(58) Field of Classification Search .................. 477/168
See application file for complete search history.

(56) References Cited

U.S. PATENT DOCUMENTS

| 5,635,805 | A | 6/1997 | Ibaraki et al. |
| 7,055,635 | B2 | 6/2006 | Itoh et al. |
| 7,100,720 | B2 * | 9/2006 | Ishikawa .................. 180/65.26 |
| 2003/0153428 | A1 | 8/2003 | Kitano et al. |
| 2003/0186778 | A1 | 10/2003 | Yamamoto et al. |
| 2007/0099750 | A1 * | 5/2007 | Hickam ......................... 477/5 |

FOREIGN PATENT DOCUMENTS

| DE | 693 01 664 T2 | 9/1996 |
| DE | 10 2004 002 442 A1 | 10/2004 |
| EP | 0 553 010 B1 | 3/1996 |
| JP | 2006161838 A | 6/2006 |

\* cited by examiner

*Primary Examiner*—Sherry L Estremsky
*Assistant Examiner*—Edwin A. Young

(57) ABSTRACT

A drivetrain of a motor vehicle has an internal combustion engine, an electric motor, a transmission, and a torque converter with a converter bypass clutch. The drivetrain is controlled such that, during an electric operating mode in which the internal combustion engine is deactivated and the electric motor is activated, and/or during a recuperation operating mode in which the internal combustion engine is deactivated and the electric motor is operated as a generator, the converter bypass clutch is permanently closed, at least between shift processes of the transmission, in order to bypass the torque converter.

9 Claims, 2 Drawing Sheets

DRIVETRAIN AND ASSOCIATED OPERATING METHOD

CROSS-REFERENCE TO RELATED APPLICATION

This application claims the priority, under 35 U.S.C. §119, of German patent application DE 10 2006 034 935.51, filed Jul. 28, 2006; the prior application is herewith incorporated by reference in its entirety.

BACKGROUND OF THE INVENTION

Field of the Invention

The present invention lies in the automotive technology field. More particularly, the invention relates to a drivetrain for a motor vehicle, in particular for a passenger vehicle, which has an internal combustion engine, an electric motor, a transmission and a torque converter with a converter bypass clutch. The invention also relates to a method for operating a drivetrain of the type.

A drive which is equipped with a drivetrain of said type is also referred to as a hybrid drive and is used in particular in modern motor vehicles, preferably in passenger vehicles. If the associated drivetrain is designed such that the internal combustion engine and electric motor can introduce torque into the drivetrain not only alternatively but also cumulatively, this is also referred to as a parallel hybrid drive. Hybrid drives of said type are characterized by a reduced level of fuel consumption and reduced pollutant emissions.

In addition, a modern drivetrain is usually equipped with a torque converter which contains a converter bypass clutch. In a torque converter of said type, the torque which is introduced for example by the internal combustion engine into the drivetrain is transmitted via a hydraulic coupling to a transmission input of the transmission. As a result of the hydraulic coupling, there can be a certain slip between the rotational speed at the input of the torque converter and the rotational speed at the output of the torque converter. It is possible by means of said slip for a torque jump during a shift process in the transmission, which is preferably an automatic transmission, to be reduced. In addition, it is possible by means of said slip, in order to increase power, to raise the rotational speed at the input of the torque converter without it being necessary to carry out a shift process in the transmission. In particular for low rotational speed ranges at the transmission input, the internal combustion engine can therefore be operated with increased rotational speeds in order to be able to introduce the desired torque into the drivetrain. This applies in particular when starting the vehicle which is equipped with the drivetrain. Slip of said type is possible only with the converter bypass clutch open. If no slip is desired, for example when the rotational speeds at the input and at the output of the torque converter are synchronized, the converter bypass clutch is closed in order to bypass the torque converter. The introduction of torque into the transmission then takes place directly and virtually without losses. This increases the efficiency of the drivetrain.

SUMMARY OF THE INVENTION

It is accordingly an object of the invention to provide a drive train and an associated operating method which overcome the above-mentioned disadvantages of the heretofore-known devices and methods of this general type and which provides for an improved embodiment of the generic drivetrain and which, in particular, increases the efficiency of the drivetrain.

With the foregoing and other objects in view there is provided, in accordance with the invention, a method for operating a drivetrain, the drivetrain including an internal combustion engine, an electric motor, a transmission, and a torque converter with a converter bypass clutch, and the method comprising the following step:

in an electric operating mode in which the internal combustion engine is deactivated and the electric motor is activated, and/or during a recuperation operating mode in which the internal combustion engine is deactivated and the electric motor is operated as a generator, permanently closing the converter bypass clutch, at least between shift processes of the transmission, for bypassing the torque converter.

With the above and other objects in view there is also provided, in accordance with the invention, a drivetrain for a motor vehicle, in particular a passenger automobile, the drivetrain comprising:

an internal combustion engine;
an electric motor;
a transmission connected to the internal combustion engine and the electric motor;
a torque converter connected between the transmission on the one side and the engine and the motor on the other side;
a converter bypass clutch for selectively bypassing the torque converter; and
a control device connected to and selectively actuating the converter bypass clutch, the control device, during an electric operating mode, in which the internal combustion engine is deactivated and the electric motor is activated, and/or during a recuperation operating mode, in which the internal combustion engine is deactivated and the electric motor is operated as a generator, holding the converter bypass clutch permanently closed, at least between shift processes of the transmission, in order to bypass the torque converter.

In other words, the invention is based on the general concept of the converter bypass clutch being permanently closed, at least between shift processes of the transmission, in order to bypass the torque converter when the drivetrain is operated in an electric operating mode in which the internal combustion engine is deactivated and the electric motor is activated, and/or when the drivetrain is operated in a recuperation operating mode in which the internal combustion engine is deactivated and the electric motor is operated as a generator. That is to say, in the context of the present invention, the converter bypass clutch is closed not only during shift processes but also when starting and during recuperation down to very low speeds, for example around zero. As a result of this embodiment, the electric motor is coupled virtually without losses to the transmission even at low rotational speeds, since slip in the torque converter is avoided. The invention is based on the knowledge that the functionality of the torque converter is not required in the electric operating mode or recuperation operating mode. It is possible in particular, in the case of the electric motor, to obtain the sufficient torque increase by means of an increased electrical energy supply even without an increase in rotational speed. In particular, the electric motor requires no idle rotational speed and delivers sufficient torque already in a low rotational speed range.

In one advantageous embodiment of the present invention, a hydraulic medium pump which supplies hydraulic medium at operating pressure to a hydraulic actuating device for actuating the converter bypass clutch, and which is drive-coupled mechanically to the drivetrain, can be assisted either by means of an electric auxiliary motor or by means of an electric auxiliary pump below a predetermined limit rotational speed of the drivetrain. Said embodiments are based on the consideration that the hydraulic medium pump, which is conventionally drive-connected to the transmission input, can no longer provide the operating pressure in the hydraulic medium required for correct operation of the actuating device at rotational speeds below the limit rotational speed, which would prevent a closure of the converter bypass clutch in said lower rotational speed range. It is however possible by means of the auxiliary motor or by means of the auxiliary pump to generate the required operating pressure even at rotational speeds below the limit rotational speed, so that the actuating device for closing the converter bypass clutch can be actuated.

Other features which are considered as characteristic for the invention are set forth in the appended claims.

Although the invention is illustrated and described herein as embodied in drivetrain and associated operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
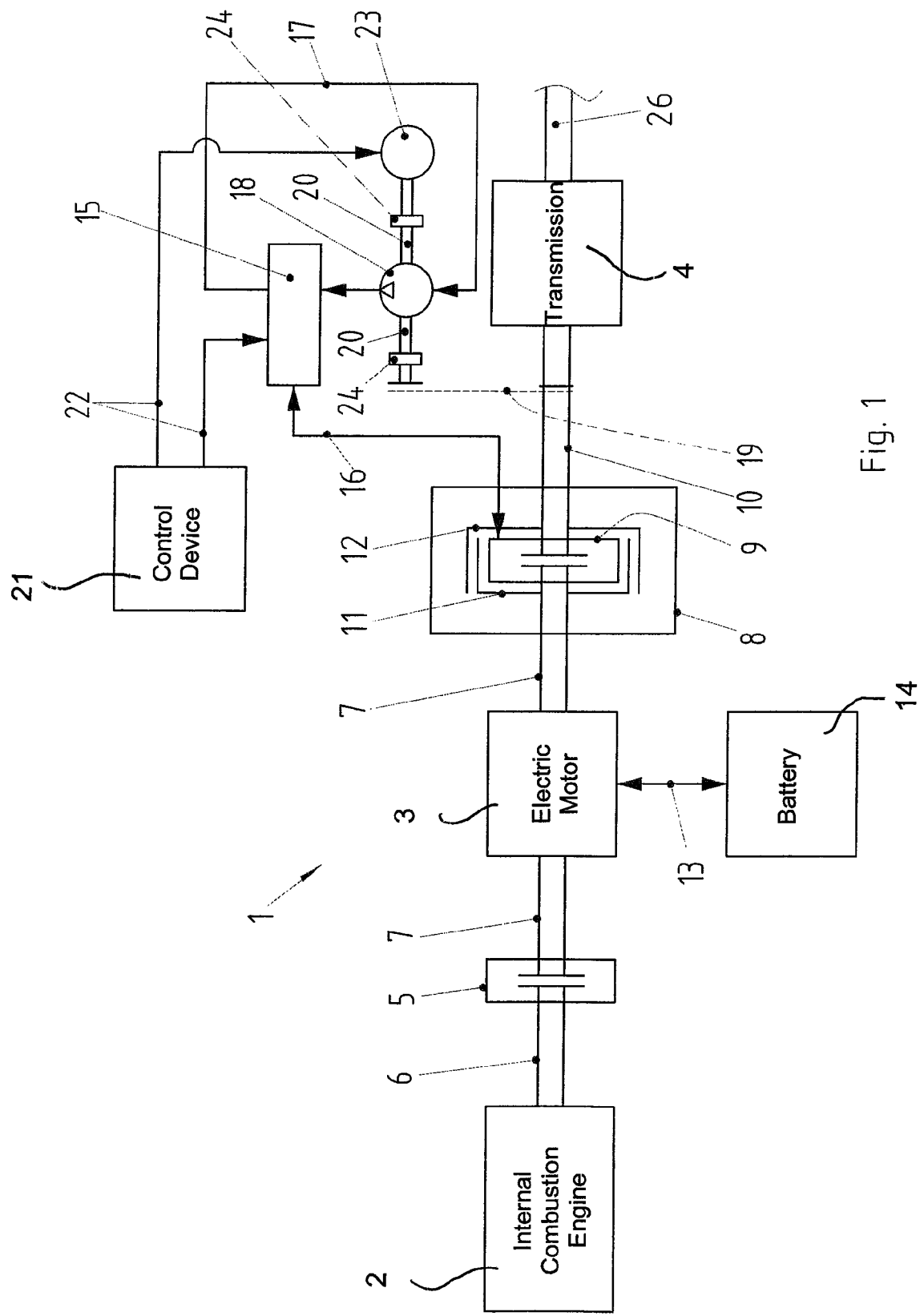
FIG. 1 is a highly simplified, circuit-diagram-type diagrammatic sketch of a first embodiment of the drivetrain according to the invention.

Referring now to the figures of the drawing in detail, there is shown a drivetrain 1 that comprises an internal combustion engine 2, an electric motor 3, and a transmission 4 which is preferably embodied as an automatic transmission. The drivetrain 1, in the preferred implementation, is disposed in a motor vehicle, in particular in a passenger vehicle. A main clutch 5 is provided which, for example, is embodied as a separating clutch. The main clutch 5 is arranged here between the internal combustion engine 2 and the electric motor 3, and here, is connected at one side to a crankshaft 6 of the internal combustion engine 2 and at the other side to a driveshaft 7 of the electric motor 3. In addition, a torque converter 8 is provided which has a converter bypass clutch 9. The torque converter 8 and therefore the converter bypass clutch 9 are arranged between the electric motor 3 and the transmission 4, so that they are drive-connected at one side to the driveshaft 7 of the electric motor 3 and at the other side to a transmission input 10 of the transmission 4. The transmission 4 is connected in the conventional way to drive wheels of the vehicle by way of a transmission output 26. The torque converter 8 has a conventional design and therefore comprises in particular a first wheel 11, which is rotationally fixedly connected to the driveshaft 7, and a second wheel 12, which is rotationally fixedly connected to the transmission input 10. The torque transmission between the wheels 11, 12 takes place hydraulically and therefore with a slip between the rotational speeds of the wheels 11, 12. In a modern torque converter 8, the magnitude of the slip can be set in certain limits. The converter bypass clutch 9 likewise functions in the conventional way and can for example be embodied as a separating clutch.

The electric motor 3 is connected to an electrical energy storage device 14, that is to say to an accumulator or battery, via an electrical energy line 13. The electric motor 3 obtains its electrical power from the electrical energy storage device 14. In addition, the electric motor 3 can be operated as a generator and can charge the electrical energy storage device 14 via the electrical energy line 13.

A hydraulically operated actuating device 15 is provided for actuating the converter bypass clutch 9. A corresponding operative connection for actuating the converter bypass clutch 9 by way of the actuating device 15 is indicated here by a double arrow and denoted by 16. The operative connection 16 may, by way of example, be formed by a rod or the like. The actuating device 15 operates with a hydraulic medium, preferably a hydraulic oil, and is for this purpose connected to a hydraulic circuit 17. The actuating device 15 is for example a piston-cylinder unit. Arranged in the hydraulic circuit 17 is a hydraulic medium pump 18 which brings the hydraulic medium in the hydraulic circuit 17 up to a predetermined operating pressure which the actuating device 15 requires in order to be able to reliably switch the converter bypass clutch 9. The hydraulic medium pump 18 is drive-coupled to the drivetrain 1. Here, the hydraulic medium pump 18 is preferably drive-coupled to the transmission input 10. A corresponding drive coupling is indicated here by a dashed line and is denoted by 19. Said drive coupling 19 can for example be realized by means of a belt drive, a chain drive or a gearwheel drive. Here, the drive coupling 19 drives a pump shaft 20.

In addition, a control device 21 is provided which is connected to the actuating device 15 by means of a corresponding control line 22. The control device 21 can therefore, by means of a corresponding actuation of the actuating device 15, open the converter bypass clutch 9 in order to activate the torque converter 8, and close the converter bypass clutch 9 in order to deactivate or bypass the torque converter 8.

Also provided in the embodiment shown in FIG. 1 is an electric auxiliary motor 23 which is drive-coupled to the hydraulic medium pump 18 by means of the pump shaft 20. The auxiliary motor 23 likewise takes its electrical energy supply from the electrical energy storage device 14. The auxiliary motor 23 can be controlled by means of the control device 21. In the example shown, the auxiliary motor 23 is drive-coupled to the hydraulic medium pump 18 by means of an overrunning clutch 24. The auxiliary motor 23 is designed such that it can drive the hydraulic medium pump 18 in order to generate the operating pressure in the hydraulic medium required for correct operation of the actuating device 15. In addition, an overrunning clutch 24 can also be arranged in the pump shaft 20 between the hydraulic medium pump 18 and the drive coupling 19.

Figure 2:
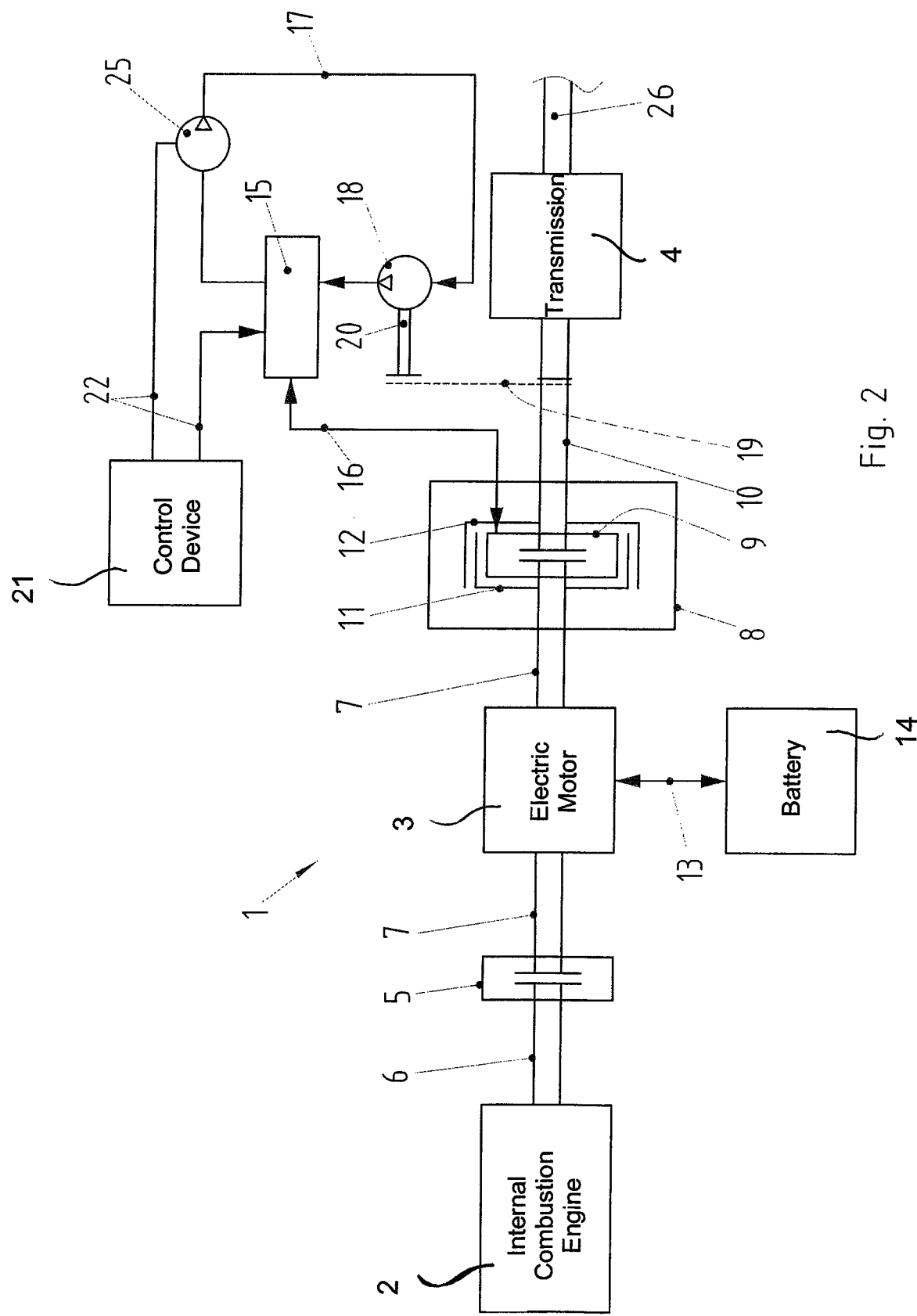
FIG. 2 is a similar view of a second exemplary embodiment.

In the embodiment shown in FIG. 2, an electric auxiliary pump 25 is provided instead of the auxiliary motor 23, which auxiliary pump 25 is connected into the hydraulic circuit 17. The auxiliary pump 25 is preferably connected to the electrical energy storage device 14 and can preferably be controlled by means of the control device 21. Here, the auxiliary pump 25 is designed such that it can generate the operating pressure in the hydraulic medium required for correct operation of the actuating device 15.

As a result of the drive forms which are based on different principles, that is to say electric motor 3 and the internal combustion engine 2, the drivetrain 1 can also be referred to as a hybrid drive. Since it is fundamentally possible in this embodiment for the internal combustion engine 2 and the electric motor 3 to be operated at the same time in order to introduce torque into the drivetrain 1, said hybrid drive can also be referred to as a parallel hybrid drive. The arrangement of the individual components of the drivetrain 1 which is shown is merely exemplary and does not restrict the generality, so that the individual components, in particular the internal combustion engine 2 and electric motor 3 can also be arranged and coupled to one another in some other way. It is in particular fundamentally possible to integrate the torque converter 8 with the converter bypass clutch 9 into the transmission 4.

The control device 21 is designed such that it can realize the operating method, which is described below, for the drivetrain 1.

The drivetrain 1 can be operated in a combustion operating mode in which the internal combustion engine 2 is activated and the electric motor 3 is deactivated. The introduction of torque into the drivetrain 1 therefore takes place entirely by means of the internal combustion engine 2. If the internal combustion engine 2 has an excess of power and if there is a corresponding demand, the electric motor 3 can also be operated during the combustion operating mode as a generator in order to charge the electrical energy storage device 14. In this operating state, the main clutch 5 is closed. The torque which is transmitted from the internal combustion engine 2 to the crankshaft 6 is then conducted via the driveshaft 7 through the electric motor 3.

The drivetrain 1 can also be operated in an electric operating mode in which the internal combustion engine 2 is deactivated and the electric motor 3 is activated. The introduction of torque into the drivetrain 1 then takes place entirely by means of the electric motor 3. In this operating mode, the main clutch 5 is open.

In addition, a dual operating mode in the drivetrain 1 can be set, in which both the electric motor 3 and the internal combustion engine 2 are activated and introduce torque into the drivetrain 1. For this purpose, the main clutch 5 is closed.

Finally, the drivetrain 1 can also be operated in a recuperation operating mode in which the internal combustion engine 2 is deactivated and in which the electric motor 3 is operated as a generator. A recuperation operating mode of said type is suitable for example for braking the drivetrain 1 or the vehicle which is equipped with the drivetrain 1. In this way, the kinetic energy of the drivetrain 1 or of the vehicle can be utilized to charge the electrical energy storage device 14. In this operating mode, the main clutch 5 is open.

During shift processes in the transmission 4, which is preferably embodied as an automatic transmission, the converter bypass clutch 9 is opened in order to be able to set a greater or lesser degree of slip at the torque converter 8. It is possible by means of the slip for a torque jump at the transmission input 10 during the shift process to be reduced. Once the transmission input 10 and the rest of the drivetrain 1 have been synchronized with regard to their rotational speed, the converter bypass clutch 9 can be closed again in order to reduce the slip back to the value zero. In the combustion operating mode, it is also necessary to operate with slip at low rotational speeds at the transmission input 10, since the internal combustion engine 2, at very low rotational speeds, in particular at its idle rotational speed, cannot introduce sufficient torque into the drivetrain 1 in order to realize desired, conventional acceleration processes for the vehicle which is equipped with said drivetrain 1. Accordingly, for this purpose, the converter bypass clutch 9 is opened in order to be able to correspondingly increase the rotational speed of the internal combustion engine 2.

During the electric operating mode, and alternatively or additionally during the recuperation operating mode, the converter bypass clutch 9 is held permanently closed, at least outside or between shift processes of the transmission 4. The converter bypass clutch 9 is therefore held closed in particular even at low rotational speeds at the transmission input 10 which lie in a low rotational speed range. In said low rotational speed range during the combustion operating mode, the converter bypass clutch 9 is conventionally opened in order to activate the torque converter 8. Said low rotational speed range can in particular extend to the minimum possible rotational speed, that is to say to the rotational speed zero, so that the converter bypass clutch 9 is always closed—with the exception of shift processes in the transmission 4—when the drivetrain 1 is operated in the electric operating mode or in the recuperation operating mode. In this way, in the electric operating mode, the electric motor 3 can transmit its entire drive power virtually without slip to the transmission input 10, as a result of which the efficiency of the drivetrain 1 is improved. Here, the knowledge is utilized that the electric motor 3, in contrast to the internal combustion engine 2, can introduce a sufficient torque into the drivetrain 1 even at low rotational speeds, and can do so without slip. It is correspondingly possible by means of said approach, in the recuperation operating mode, even at low rotational speeds at the transmission input 10, to utilize the kinetic energy of the drivetrain 1, or of the vehicle which is equipped with said drivetrain 1, to charge the electrical energy storage device 14, as a result of which the overall efficiency of the drivetrain 1 is likewise improved. Here, too, the approach is based on the consideration that the electric motor 3 which is operating as a generator functions sufficiently even at comparatively low rotational speeds at the transmission input 10, so that it is possible to utilize the kinetic energy for charging the electrical energy storage device 14 in particular up to full braking of the vehicle.

In order to keep the expenditure for realizing said operating mode as low as possible, the shift processes in the transmission 4 are preferably exempted from the closed state of the converter bypass clutch 9, so that the transmission 4 and the drivetrain 1 can be operated with the conventional shift procedure for the respective shift processes. An embodiment is however also fundamentally conceivable in which the converter bypass clutch 9 remains closed even during shift processes in the transmission 4 in the electric operating mode and/or in the recuperation operating mode.

If the hydraulic actuating device 15, as in the exemplary embodiments shown here, operates with a mechanically driven hydraulic medium pump 18, which is drive-coupled here to the drivetrain 1 or to the transmission input 10, there is the fundamental difficulty, at low rotational speeds in the drivetrain 1 or at the transmission input 10, of providing the operating pressure in the hydraulic circuit 17 required for the correct operation of the actuating device 15. In the embodiment shown in FIG. 1, for the case that the rotational speed in the drivetrain 1 or, here, at the transmission input 10 falls below a predetermined limit rotational speed, the auxiliary motor 23 is activated in such a way that the desired operating pressure can be provided by means of the hydraulic medium pump 18. Here, the overrunning clutch 24 which is arranged between the hydraulic medium pump 18 and the drive coupling 19 permits the rotational speed of the pump shaft 20 which is higher than that of the transmission input 10. At rotational speeds of the drivetrain 1 or of the transmission input 10 which lie above the limit rotational speed, the auxiliary motor 23 can be deactivated again. Here, the overrunning clutch 24 between the auxiliary motor 23 and the hydraulic medium pump 18 permits rotations of the pump shaft 20 independently of the auxiliary motor 23.

In the embodiment shown in FIG. 2, when the limit rotational speed in the drivetrain 1, or here, at the transmission input 10, is undershot, the auxiliary pump 25 is activated, which then generates the desired operating pressure in the hydraulic circuit 17. Alternatively or in addition to the rotational-speed-dependent activation of the auxiliary motor 23 or of the auxiliary pump 25, it is also possible to provide pressure-dependent activation, for which purpose the pressure in the hydraulic medium is monitored. The auxiliary motor 23 or the auxiliary pump 25 is activated once the hydraulic medium pressure falls below a predetermined limit pressure.

It is therefore possible by means of the auxiliary motor 23 or by means of the auxiliary pump 25 even in the low rotational speed range, which can in particular extend to standstill, that is to say to the rotational speed zero, at the transmission input 10, for sufficient operating pressure for the operation of the actuating device 15 and therefore for switching the converter bypass clutch 9 to be provided. Here, the auxiliary motor 23 and auxiliary pump 25 form components which can be directly retroactively installed in order to be able to retrofit a conventional drivetrain 1 with a mechanically drive-coupled hydraulic medium pump 18 in order to implement the operating method proposed here.

The invention claimed is:

1. A method for operating a drivetrain, the drivetrain including an internal combustion engine, an electric motor, a transmission, and a torque converter with a converter bypass clutch, and the method which comprises the following steps:
   in an electric operating mode in which the internal combustion engine is deactivated and the electric motor is activated, and/or during a recuperation operating mode in which the internal combustion engine is deactivated and the electric motor is operated as a generator, closing without slipping the converter bypass clutch, at least between shift processes of the transmission, for bypassing the torque converter; and
   driving a hydraulic medium pump, which supplies hydraulic medium at operating pressure to a hydraulic actuating device for actuating the converter bypass clutch, and which is drive-coupled to the drivetrain, by way of an electric auxiliary motor below a predetermined limit rotational speed of the drivetrain and/or below a predetermined limit pressure in the hydraulic medium.

2. The method according to claim 1, which comprises maintaining the converter bypass clutch closed even during shift processes of the transmission during the electric operating mode and/or during the recuperation operating mode.

3. A method for operating a drivetrain, the drivetrain including an internal combustion engine, an electric motor, a transmission, and a torque converter with a converter bypass clutch, and the method which comprises the following steps:
   in an electric operating mode in which the internal combustion engine is deactivated and the electric motor is activated, and/or during a recuperation operating mode in which the internal combustion engine is deactivated and the electric motor is operated as a generator, permanently closing the converter bypass clutch, at least between shift processes of the transmission, for bypassing the torque converter; and
   supplying a hydraulic actuating device for actuating the converter bypass clutch with hydraulic medium at operating pressure by way of a hydraulic medium pump, which is drive-coupled to the drivetrain, above a predetermined limit rotational speed of the drivetrain and/or above a predetermined limit pressure in the hydraulic medium, and supplying the hydraulic actuating device for actuating the converter bypass clutch with hydraulic medium at operating pressure by way of an electric auxiliary pump below the predetermined limit rotational speed of the drivetrain and/or below the predetermined limit pressure in the hydraulic medium.

4. The method according to claim 3, which comprises maintaining the converter bypass clutch closed even during shift processes of the transmission during the electric operating mode and/or during the recuperation operating mode.

5. A drivetrain for a motor vehicle, comprising:
   an internal combustion engine;
   an electric motor;
   a transmission connected to said internal combustion engine and said electric motor;
   a torque converter connected to said internal combustion engine and said electric motor;
   a converter bypass clutch for selectively bypassing said torque converter;
   a control device for selectively actuating said converter bypass clutch, said control device, during an electric operating mode, in which said internal combustion engine is deactivated and said electric motor is activated, and/or during a recuperation operating mode, in which said internal combustion engine is deactivated and said electric motor is operated as a generator, holding said converter bypass clutch closed without slipping, at least between shift processes of said transmission, in order to bypass said torque converter;
   a hydraulic actuating device connected to said control device for actuating said converter bypass clutch;
   a hydraulic medium pump connected to said actuating device, said hydraulic medium pump being drive-coupled to the drivetrain and supplying said actuating device with hydraulic medium at operating pressure; and
   an electric auxiliary motor for driving said hydraulic medium pump or an electric auxiliary pump for supplying said actuating device with hydraulic medium at operating pressure.

6. The drivetrain according to claim 5, wherein said control device is configured to hold said converter bypass clutch closed even during shift processes of said transmission during the electric operating mode and/or during the recuperation operating mode.

7. The drivetrain according to claim 5, wherein the control device is configured to activate said auxiliary motor or said auxiliary pump when a rotational speed of the drivetrain falls below a predetermined limit rotational speed and/or when a pressure in the hydraulic medium falls below a predetermined limit pressure.

8. The drivetrain according to claim 5, which further comprises an overrunning clutch drive-coupling said hydraulic medium pump to said auxiliary motor and/or to said drivetrain.

9. The drivetrain according to claim 5, wherein said control device is configured to maintain said converter bypass clutch closed even during shift processes of said transmission during the electric operating mode and/or during the recuperation operating mode.

* * * * *